United States Patent [19]
Caplan

[11] 3,841,738
[45] Oct. 15, 1974

[54] CURVED PAPER PANEL REFLECTIVE STRUCTURE

[76] Inventor: Harry W. Caplan, 3397 E. Monmouth Rd., Cleveland Heights, Ohio 44118

[22] Filed: Oct. 19, 1973

[21] Appl. No.: 407,943

[52] U.S. Cl. .................. 350/293, 350/288, 350/310, 126/271
[51] Int. Cl. ............................................ G02b 5/10
[58] Field of Search .......... 350/288, 293, 294, 299, 350/310, 298; 126/271

[56] References Cited
UNITED STATES PATENTS

| | | | |
|---|---|---|---|
| 1,890,166 | 12/1932 | Shatto | 350/310 |
| 3,463,577 | 8/1969 | Friedberg | 350/298 |
| 3,600,257 | 8/1971 | Reinhardt | 350/310 |

*Primary Examiner*—Ronald L. Wibert
*Assistant Examiner*—Michael J. Tokar
*Attorney, Agent, or Firm*—Watts, Hoffmann, Fisher & Heinke Co.

[57] ABSTRACT

An inexpensive, lightweight reflective panel for solar-thermal collector modules of the type including a parabolic reflector for reflecting incident solar radiation onto a fluid carrying conduit positioned along the focal axis of the reflector. A rigid, waterproof, honeycomb panel formed from paper and having a uniform thickness of parabolic shape supports a reflective material. Glass fiber cloth adhered to the outer panel surfaces adds to the panel's strength and rigidity. An adjustable support system suspends the reflective panel from the fluid carrying conduit and provides a means of adjusting panel curvature to precisely obtain the required parabolic shape.

Methods of forming the panels are described which permit the panels to be formed at or near the site of their installation to obviate shipping problems and expense. The methods include the steps of forming an expanded honeycomb core, conforming the core to the required parabolic shape, adhering sheets of skin material to top and bottom surfaces of the core, and adhering a reflective material to the top panel surface.

7 Claims, 6 Drawing Figures

CURVED PAPER PANEL REFLECTIVE STRUCTURE

CROSS REFERENCES TO RELATED PATENTS

APPARATUS FOR UTILIZING SOLAR HEAT, U.S. Pat. No. 257,560 issued May 9, 1882 to G. W. Deitzler.

SOLAR HEATER, U.S. Pat. No. 1,946,184 issued Feb. 6, 1934 to G. G. Abbot.

SALINE SPRAY DISTILLATION WITHIN ROTATING SOLAR HEATER, U.S. Pat. No. 3,300,393 issued Jan. 24, 1967 to F. G. Fisher.

BACKGROUND OF THE INVENTION

1. Field of the Invention

The present invention relates generally to solar-thermal power systems, and more particularly to novel and improved, lightweight and economical, reflective panels for use in such systems, together with methods of making the panels.

2. Prior Art

Solar heaters are known which include concave, troughlike reflectors for reflecting incident solar energy toward a fluid carrying conduit positioned above the reflective surface along its focal axis. A wide variety of uses have been proposed for such fluid heaters including distilling the heated fluid, extracting energy from the heated fluid in a turbine or in a heat exchanger, and storing the heated fluid for subsequent use. The referenced patents are typical of such proposed systems.

It has also been proposed to deploy large numbers of these solar heaters in a side-by-side array across such relatively arid landscapes as are typically found in the state of Arizona to provide vast terrestrial solar-thermal power systems. The function of such systems would be to generate electricity by passing the heated fluid through turbines.

While terrestrial solar-thermal energy plants have been proposed, the construction costs involved have prohibited their large scale adoption. The cost of the reflective material alone is illustrative of this problem. In present day economics, a reflective surface is considered economical if it can be provided for a cost of about two dollars per square foot. This is the cost of the material which forms the reflecting surface itself, and does not include the required underlying supporting materials or the rotary mechanism which movably carries the reflector to maintain its alignment with the sun.

As will be apparent, where many acres of land are to be covered with side-by-side arrays of these solar heater modules, the cost of the reflective material along is quite high. This, coupled with the cost of the required support materials and their rotary mounts is prohibitive to the building of terrestrial solar-thermal energy plants that can compete favorably with the more conventional power generation systems in present day use.

In an effort to minimize the cost of the reflective material, construction economics would suggest that the parabolic reflectors be as wide as possible. Large reflectors spread over a designated ground area require somewhat less reflective material than do small reflectors since the small reflectors have more frequently spaced upwardly curved wall portions that must be covered with reflective material. Construction economics would likewise suggest the desirability of using the widest possible reflectors in order to minimize the number of collector modules required to cover a designated area, thereby minimizing the required number of upstanding rotary supports, the lineal feet of fluid conduit, etc.

Increasing the size of the reflectors is not, however, without its drawbacks. In reality, with present day reflector structures, there are a number of factors which come increasingly into play as reflector size is increased and which destroy all savings that would otherwise be gained by increasing reflector size. Some of these factors can be summarized as follows:

1. To begin with, the larger the reflector, the greater is the need for absolute accuracy of the parabolic reflective surface. Reflectors which are 10 or 12 feet in width and which focus incident solar radiation onto a 2 or 3 inch diameter conduit must not have a distorted reflective surface or the reflected radiation will bypass the conduit entirely. In short, as reflector size increases, so does its cost due to reduced tolerances requiring greater accuracy in the reflective surface contour.
2. Secondly, the larger the reflector, the greater is the need for its structural rigidity. It is not enough to accurately form a large reflector. For it to have any use, it must have sufficient inherent rigidity to retain the curvature of the reflective surface. In short, as reflector size increases, its thickness and weight and the complexity of its integral framework must also increase — usually at a nearly exponential rate.
3. Thirdly, as reflector size and weight increase, so does the complexity and cost of the attendant structure for supporting and rotating the reflector to retain its alignment with the sun.
4. Fourthly, all this increase in size and weight and structural complexity vastly magnifies the problems attendant manufacturing, shipping, installing and servicing the collector modules.

In summary, while terrestrial solar-thermal power plants have been proposed, the problem of providing large inexpensive reflectors that do not require expensive supporting structures remains unsolved and stands as a barrier to the widespread acceptance of this essentially pollution-free approach to power generation.

SUMMARY OF THE INVENTION

The present invention overcomes the foregoing and other drawbacks of the prior art, and provides novel and improved reflective panels which are extremely light in weight and inexpensive to form, together with methods of forming the reflective panels. The reflective panels of the present invention have utility in a variety of solar-thermal heater systems and are particularly well adapted for use in terrestrial solarthermal energy plants.

In accordance with one aspect of the present invention, a lightweight reflector understructure or supporting panel is provided which is formed of lightweight material such as thin sheets and strips of paper. The core of the supporting panel is preferably an expanded paper honeycomb formed from strips of paper positioned in side-by-side relationship and adhered together at spaced intervals to define an array of open ended cells. A pair of paper facing sheets are adhered to the top and bottom surfaces of the core and serve to close opposite ends of the honeycomb cells. Edge regions of the facing sheets are folded around the sides of the honeycomb core and adhered in overlapping relationship to seal the core region. A waterproofing material is then applied to the outer surface of the panel, and a reflective material is applied to the top panel surface.

The panels can be formed in a continuous production process which is sufficiently simple to enable its performance at or quite near the installation site. In one described method, the panel fabricating apparatus is mounted on two semi-trailer trucks which can be positioned side-by-side to produce panels having a width of about 16 feet.

A first step in the process is the formation of the honeycomb core. Honeycomb cores formed from paper can be bought commercially from such manufacturers as the Union Camp Paper Company. Alternatively, they can be manufactured at the panel assembly site by adhering side-by-side strips of paper, together at uniformly spaced intervals to provide a core, which, when expanded, provides an array of uniform, parallel extending open-ended cells.

A second step is to conform the core to a parabolic shape. This is preferably carried out in a continuous fashion as the expanded core is fed through an array of rolls which provide a transition from planar to parabolic form. The core may also be heated as it passes through these shaping rolls.

A third step is to adhesively secure facing sheets to the top and bottom surfaces of the core. This is preferably effected by feeding facing sheets such as paper from supply rolls positioned on opposite sides of the core feed path into engagement with the core surfaces. Before the facing sheets contact the core surfaces, the inner sides of the facing sheets are coated with adhesive.

A fourth step is to fold edge portions of the facing sheets around the sides of the core and to adhere these portions in overlapping relationship to seal the core region. A waterproofing agent is then sprayed onto the outer surfaces of the sealed panel. As the panel passes sequentially through portions of the apparatus where the panel is sealed and waterproofed, the core adhesive cures securely adhering the core to the facing sheets.

A fifth and optional step is to adhere a sheet of glass fiber material to outer surface portions of the panel to reinforce the panel as may be required in areas subject to high winds. One way of adhering the glass fiber material to the panel is to apply it prior to the waterproofing coating, and using a coating which serves both as an adhesive to bond the glass fiber sheet in place, and as a waterproofing agent to protect the panel.

A sixth step is to cut the panels to a length compatible with the associated collector module supporting structure. End regions of the panels are then sealed and waterproofed.

A seventh step is to adhere a reflective material to the panel. This step can be performed at any of several times which differ somewhat depending on the type of reflective material used. Where stainless steel or other metallic foil is used as the reflective material, it can be applied in a continuous process as the panel is formed. Where mirrored glass strips are used as the reflective material, it is preferred that they be installed after the panel has been secured to its supporting structure.

In the preferred embodiment, the honeycomb supporting panel is formed with facing sheets of virgin craft paper having a thickness within the range of about 0.015 to about 0.035 inches, with about 0.025 being the preferred thickness. The strips which form the core structure are preferably virgin craft paper having a thickness of about 0.005 to about 0.015, with about 0.008 being the preferred thickness.

The cells formed by the core are preferably within the range of about 3 to about 6 inches in length, with the preferred length being about 4 inches. The cross-sectional area off the cells is preferably within the range of about 0.75 to about 2.50 square inches, with the preferred area being about 1.00 square inch. The relationship between cell length "L" and cell cross-sectional area "A" is preferably such that the length L equals about 2 to about 10 times the square root of the area A, with the preferred multiplication constant being about 4.

Reflective panels constructed in accordance with the present invention have a great many advantages over prior art reflectors. The panels are very inexpensive and easy to form. They are formed from materials which can be assembled at or near the installation site, thereby obviating shipping costs. The panels are very light in weight. They can be manuevered easily for installation even when formed in large sizes such as about 16 feet in width and about 40 feet in length. They do not require extensive and expensive, heavy duty supporting stands. Moreover, they are quite durable and long-lived when installed in arid regions such as are found in the state of Arizona.

A significant feature of the panels is that they are well adapted for use with any of several different types of reflective materials. It has been found that strips of mirrored glass can be purchased quite inexpensively from a number of mirror companies. Mirror companies apparently stock a limited number of sizes of mirrored glass, and cut strips of about 1 to 3 inch widths off of these stock sizes to fill special orders for non-standard mirror sizes. The panels of the present invention are quite well adapted for use with these scrap strips of mirrored glass. A suitable heavy body weatherproof mastic adhesive such as that sold by the 3M Company under the designation EC 896 is used to secure the mirror strips permanently to the parabolic supporting surface of the panel.

Other types of reflective surfaces can also be used at a lesser expense than was possible with prior art reflectors. Thin metallic reflective foils of about 0.002 or 0.003 inch thickness can be adhered to the panel. The foil relies on the panel itself to retain the smooth wrinkle-free reflective foil surface. In prior art reflectors, it is customary to use thicker sheets of metal and to rely at least in part on the integrity of the metal sheet to retain the smooth character of the reflective surface.

In accordance with another feature of the present invention, a simple and inexpensive adjustable panel support system is provided to support the novel panels from fluid carrying conduits heated by the panels. The support system preferably includes saddle-like support members which extend around the fluid conduits. A pair of legs on each of the support members depend toward the associated panel. Threaded fasteners couple these legs to the panels and provide a means for adjusting the curvature of the panels to conform to the required parabolic shape.

As will be apparent from the foregoing summary, it is a general object of the present invention to provide novel and improved, lightweight and inexpensive reflective panels and panel support systems for solar-thermal systems, together with improved methods for fabricating these panels.

Other objects and a fuller understanding of the invention may be had by referring to the following description and claims taken in conjunction with the accompanying drawings.

DESCRIPTION OF THE PREFERRED EMBODIMENT

Figure 1:
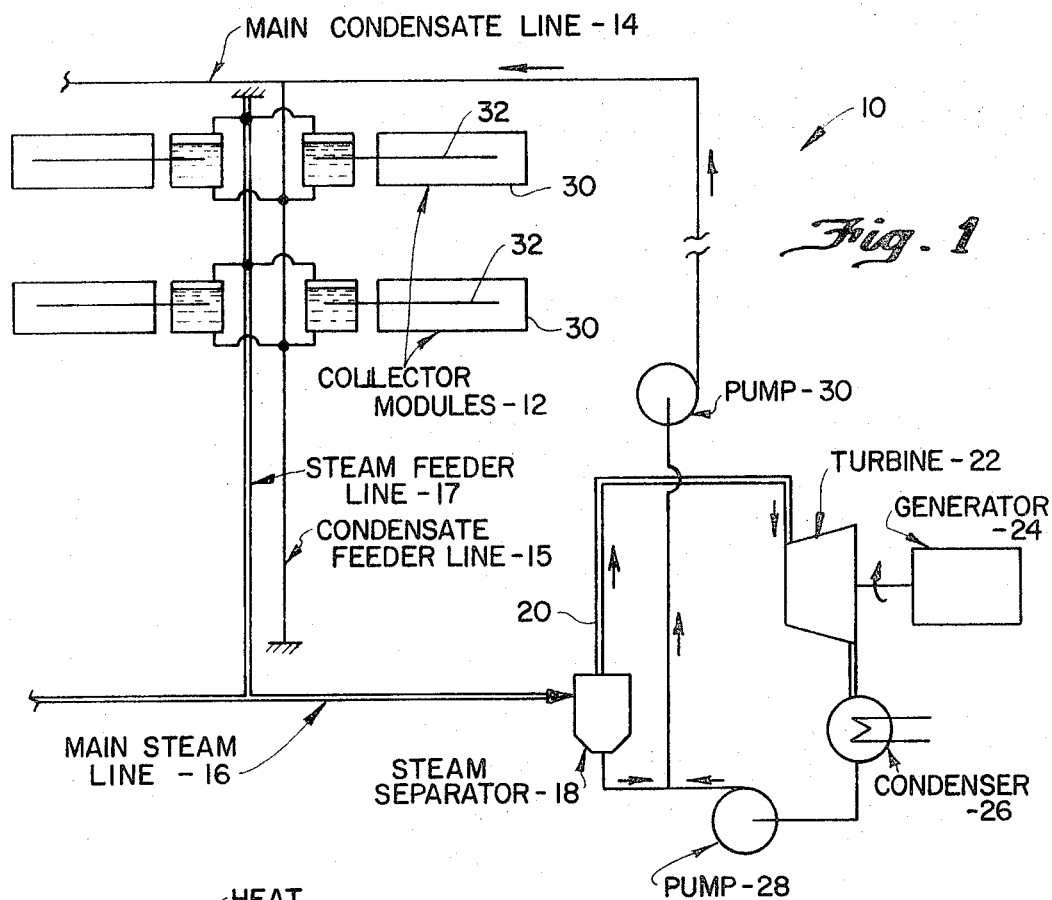
FIG. 1 is a schematic top plan view of a terrestrial solar-thermal power plant.

Referring to FIG. 1, a terrestrial solar-thermal power system is shown schematically at 10. The system 10 includes a side-by-side array of solar collector modules 12. A transfer loop piping network including main and feeder condensate lines 14, 15 and, main and feeder steam lines 16, 17 connect with the collector modules 12. The modules 12 utilize incident solar energy to convert water received from the condensate lines 14, 15 to steam which is delivered to the steam lines 16, 17.

The steam line 16 ducts steam to a separator 18 which separates out any residual liquid. Steam from the separator 18 is then transmitted through a conduit 20 to a turbine 22. As the steam passes through the turbine, its thermal and kinetic energy is converted to rotary drive shaft motion used to power an electrical generator 25. Steam exhausted from the turbine 22 is condensed to liquid in a condenser 26. Pumps 28, 30 return the condensed water to the condensate line 14 for recycling.

Figure 2:
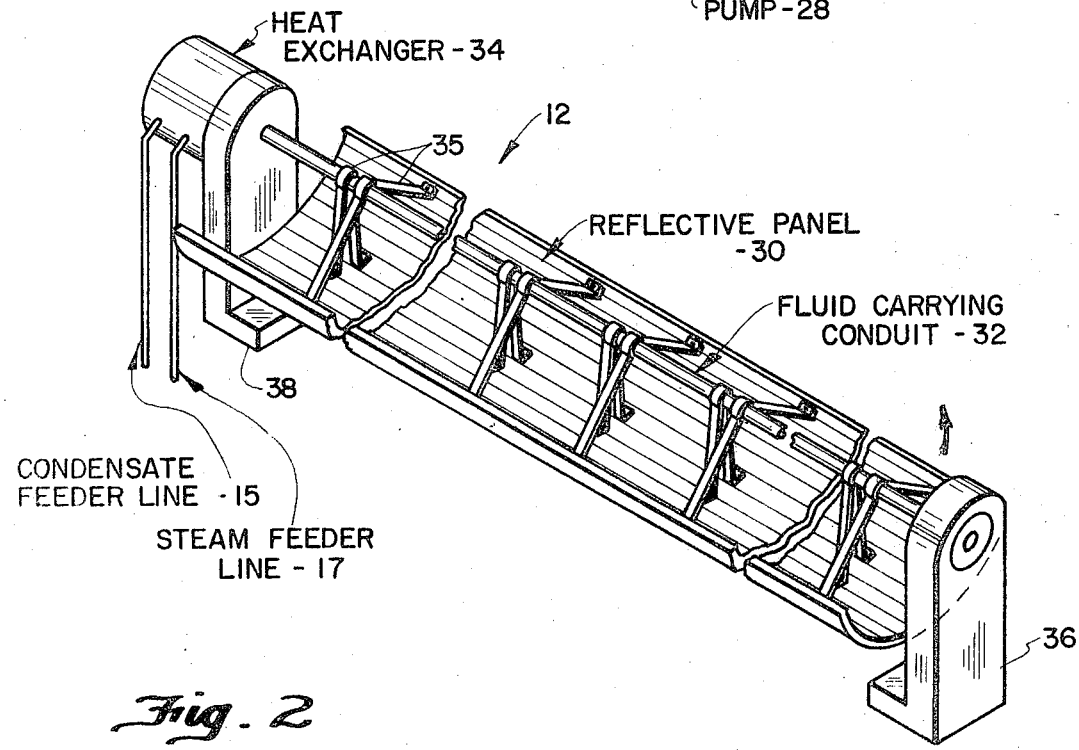
FIG. 2 is an enlarged schematic perspective view of one of the collector modules used in the power plant of FIG. 1.

Referring to FIG. 2, each of the collector modules 12 includes a concave, trough-like reflective panel 30 for reflecting incident solar radiation toward on a fluid carrying conduit 32 positioned along the focal axis of the reflective panel 30. In the system embodiment illustrated in FIGS. 1 and 2, the conduit 32 is preferably a heat pipe having a blackened outer surface to facilitate its absorbing radiation. The heat pipe is preferably situated in a vaccum evacuated glass tube (not shown).

The heat pipe 32 extends into a heat exchanger 34 located at one end of the module 12. The heat exchanger 34 ducts water from the feeder line 15 into contact with the heat pipe 32. Heat transferred from the heat pipe 32 to the water converts the water to steam which is ducted out of the heat exchanger 34 by the steam feeder line 17.

The panel 30 is suspended by support members 35 from the conduit 35. Opposite end regions of the conduit 35 are journaled for rotation in a pair of upright stands 36, 38. Electrical motors 40 carried on the stands 36, 38 rotate the reflective panel 30 about the axis of the conduit 32 to maintain alignment with the sun.

The above-described terrestrial solar-thermal power system 10 is typical of such systems as present a need for low-cost, lightweight reflective panels 30 of the type provided by the present invention.

Figure 3:
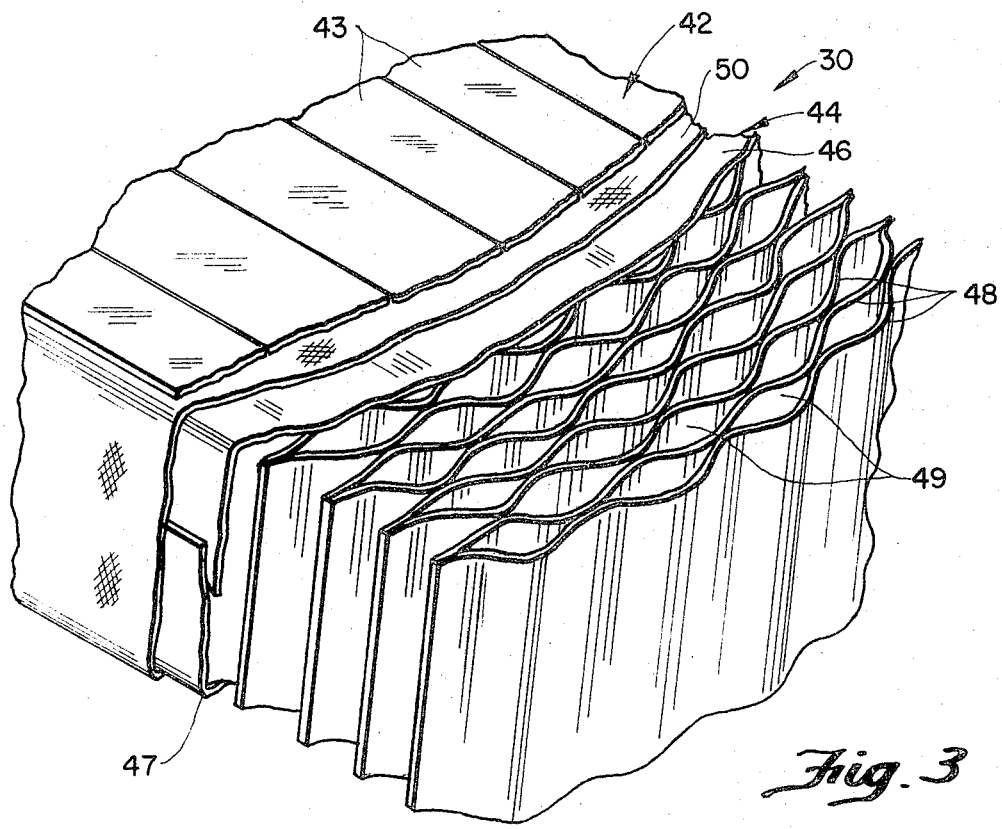
FIG. 3 is an enlarged perspective view of a portion of the reflective panel employed in the collector module of FIG. 2.
Figure 4:
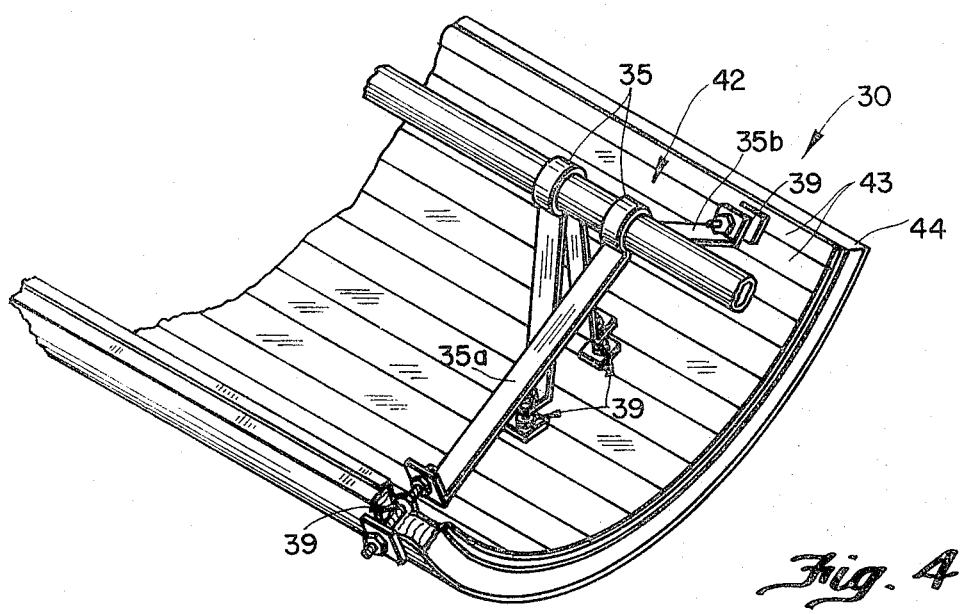
FIG. 4 is a perspective view showing a portion of the reflective panel and its supporting structure, the view being at a scale intermediate to that used in FIGS. 2 and 3.

Referring to FIGS. 3, 4, the reflective panel 30, comprises a reflective material 42 supported on a trough-like honeycomb panel 44. The reflective material preferably comprises strips 43 of glass which have been silvered on the backside in the conventional fashion mirrors are made. The strips 43 are preferably about two inches wide and are laid side-by-side to extend longitudinally of the panel 44. Reflective metallic foils adhered directly to the panel 44 can be used in place of the mirrored glass strips 43.

The panel 44 is preferably formed from virgin craft paper and includes two relatively thick facing sheets 46, 47, preferably have a thickness within the range of about 0.015 to about 0.035 inches with the preferred thickness being about 0.025. The corrugated strips 48 preferably have a thickness within the range of about 0.005 to about 0.015, with the preferred thickness being about 0.008.

The strips 48 are preferably of a width within the range of about 3 to 6 inches, the most preferred width being about 4 inches. The corrugations formed in the strips 48 are preferably of such size and shape as will permit adjacent strips to be adhered together to form an array of generally tubular cells 49, each having a cross-sectional area of about one square inch. The preferred relationship between the width of the strips 48, i.e., the length L of the cells 49, and the cross-sectional area A of the cells, is for the cell length L to be within the range of about 2 to 10 times the square root of the cell area A, the more preferred range being about 3 to 7, and the most preferred multiplication factor being about 4.

Edge portions of the facing sheets 46, 47 are folded around the sides of the core structure, as shown at 46a, 47a in FIG. 3, and are adhered in overlapping relationship to define a sealed core region.

The adhesive used to secure the core strips 43 together and to secure the facing strips 46, 47, to the core strips 43 can be any of a number of water base adhesives such as that sold by Swift Chemical and Adhesive Company under the designation 4252, or that sold by National Starch Company under the designation Durlock 42-2150. Alternatively, any of a variety of polyester resin adhesives which are water resistant can be used, such as that sold by Marco Manufacturing Comapny under the designation GR 455.

The exterior surfaces of the panel 44 are coated with waterproofing material. The preferred coating material is a polyester resin which not only serves to waterproof the panel but also contributes to the strength and rigidity of the panel. Alternatively, sheets of plastic can be adhered around the outer panel surfaces to prevent water penetration.

In some installations, as where high winds are frequently encountered, it is desirable to further reinforce the panel 44 by adhering one or more glass fiber sheets 50 over the outer panel surfaces. The glass fiber sheets 50 are preferably adhered in place by the same polyester resin used to waterproof the panels.

The adhesive used to adhere the reflective material 42 to the panel should be waterproof and should be selected to be effective with the type of reflective material being used. If the reflective material comprises strips of mirrored glass 43, an acceptable adhesive is a heavy body mastic sold by the 3M Company under the designation EC896.

The cost of reflective panels formed in accordance with the present invention is quite low. Where the supporting panel is formed from craft paper with a 4 inch honeycomb thickness, and the reflective material comprises strips of scrap mirrored glass bought from any of a number of large mirror companies, the cost per square foot of panel amounts to about $.50, including $.20 for the mirrored glass, $.14 for paper, $.06 for adhesive, and $.10 for labor. As will be apparent, this very low cost compares very favorably with prior art reflectors where the cost of the reflective material alone is seldom less than about $2.00 per square foot, not including the cost of the underlying support structure.

In accordance with another feature of the present invention, the support members 35 are adjustable to permit minute adjustments to be made in panel curvature so that the reflective surface accurately conforms to its required parabolic configuration. As is best seen in FIG. 4, the support members 35 have depending legs 35a, 35b. Threaded fasteners 39 extend through the panel 30 and adjustably couple the panel 30 to the legs 35a, 35b.

Figure 5:
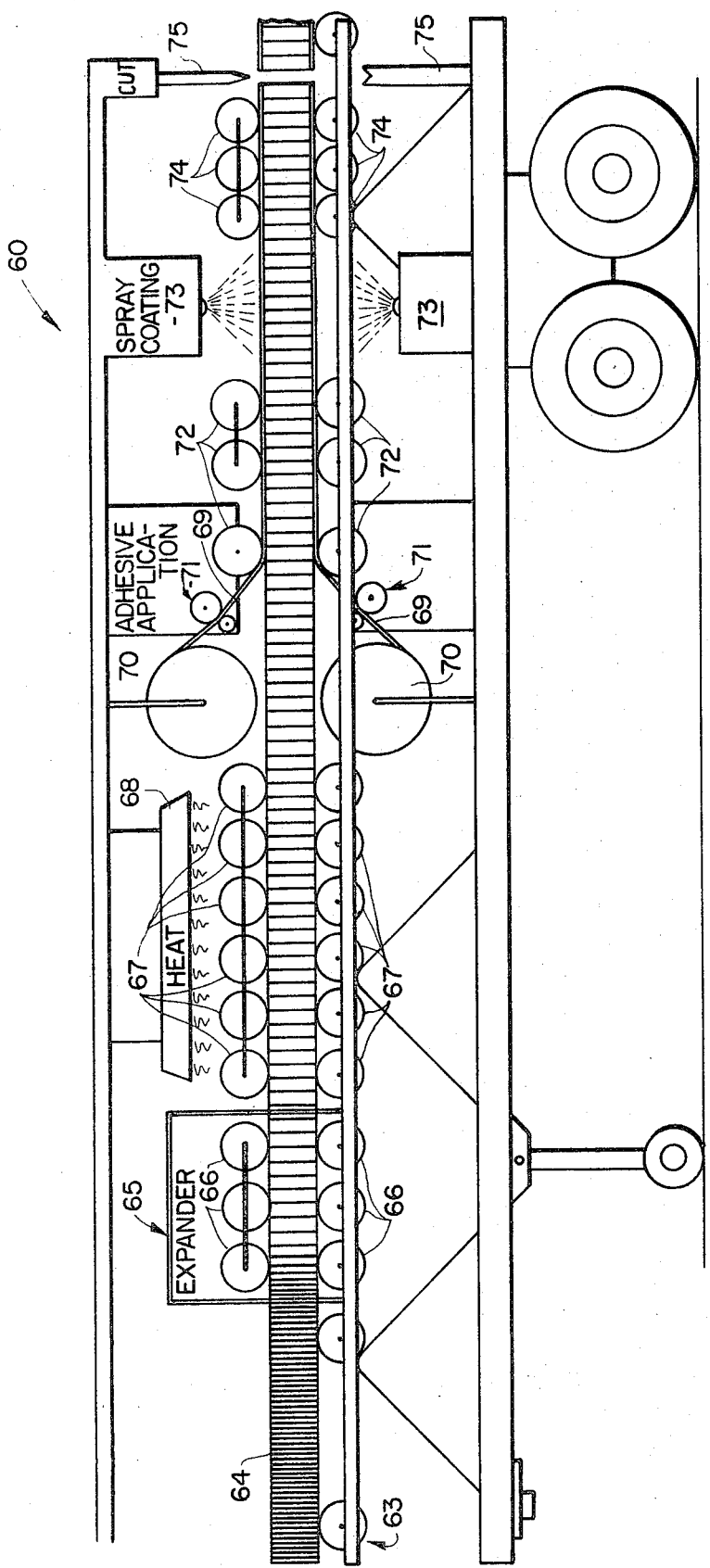
FIG. 5 is a schematic side elevational view of an apparatus for forming reflective panels.
Figure 6:
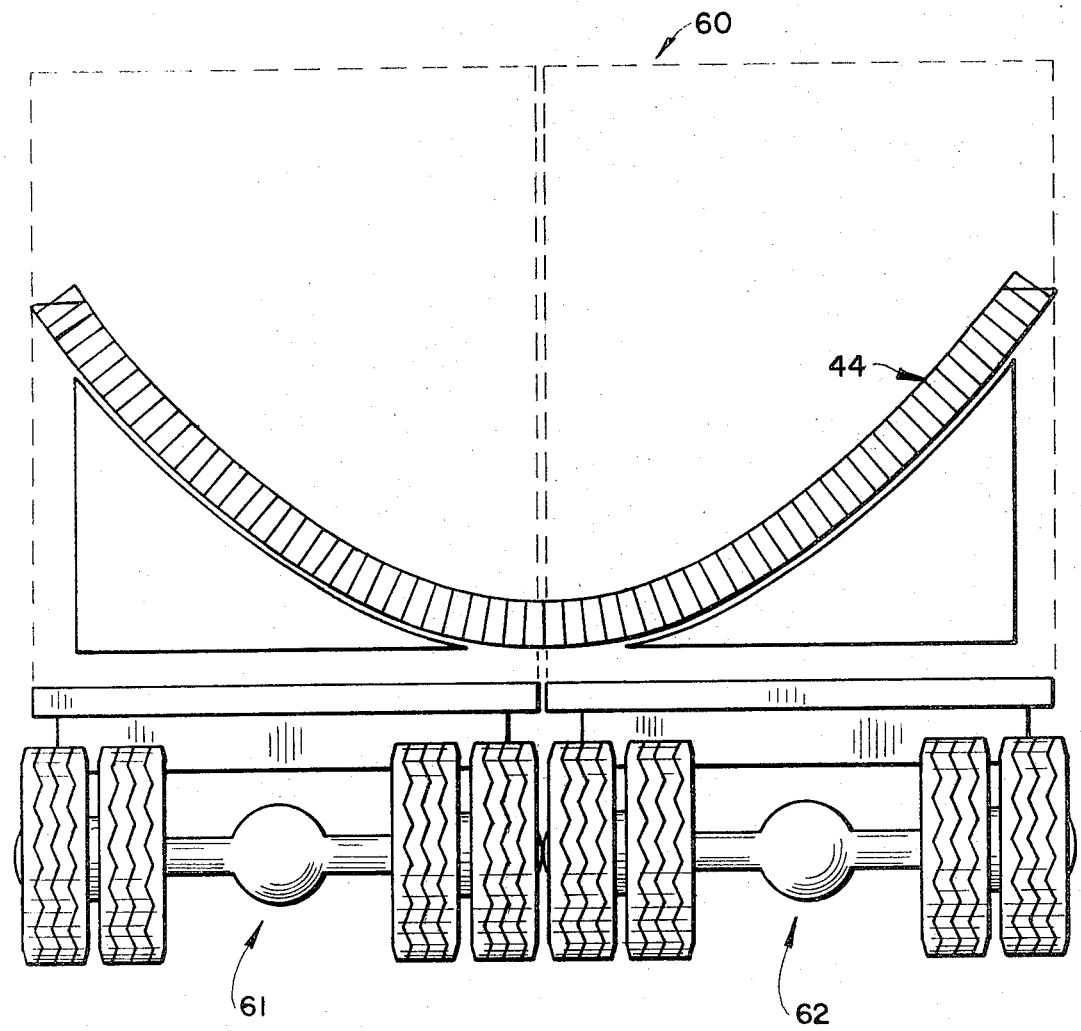
FIG. 6 is a schematic and elevational view of the apparatus of FIG. 5.

Referring to FIGS. 5 and 6, one form of apparatus for fabricating the reflective panels of the present invention is illustrated schematically at 60. The apparatus 60 is preferably mounted atop two semi-trailer truck beds 61, 62, as best seen in FIGS. 6, and is disassemblable into two halves for transporation. The apparatus 60 includes a conveyor 63 for feeding collapsed preformed honeycomb core material 64 to an expander unit 65. The expander unit 65 includes top and bottom rolls 66 which are driven at sequentially higher speeds to effect expansion of the honeycomb core material 64. Once the honeycomb core has been expanded, it then progresses through a series of rolls 67 which conform the core to a parabolic configuration. A heater 68 may also be used to supply heat to the core material as it passes through the shaping rolls 67. As the core material emerges from the rolls 67, it has assumed its final parabolic configuration.

Paper facing sheets 69 are adhered to the shaped core structure. The facing sheets 69 are supplied in continuous fashion from rolls 70 positioned above and below the core feed path. Adhesive applicators 71 apply adhesive to the inner sides of the facing strips 69 prior to their being brought into engagement with the spaed core material. A series of rolls 72 compress the facing sheets 69 into firm engagement with the core material.

A spray coating apparatus 73 coats the outer surfaces of the panel structure. A series of guide rolls 74 direct the coated panel to a cut off station 75 which is used to cut the panel to preferred lengths such as about 40 feet.

Where desired, a reinforcing cloth of glass fiber material can be applied from continuous rolls (not shown) to the panel structure prior to its being coated in the spray coating apparatus 73. Where the reflective material being used is a metallic foil, it can be applied from continuous rolls (not shown) subsequent to the application of the spray coating and prior to the time when the complete panel reaches the cut off station 75.

As will be apparent from the foregoing, the methods for manufacturing panels in accordance with the present invention are relatively simple to carryout and can be performed without great difficulty at or relatively near to a solar-thermal power-system installation site. This capability obviates shipping problems and expense, and together with the reduced cost of the panels themselves provides a system which enables reflective panels to be formed at a cost that is not prohibitive to the construction of terrestrial solar-thermal power plants.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed.

What is claimed is:

1. A lightweight parabolic reflector for solar-thermal collector modules, comprising:
    a. an adhesively bonded panel assembly formed from paper and defining a parabolic mounting surface extending longitudinally of the panel;
    b. a reflective material adhered to said mounting surface for support and being operable to reflect incident solar radiation toward a common focal axis extending longitudinally of said panel assembly;
    c. said panel assembly including first and second sheets of paper positioned in uniformly spaced relationship to define the thickness of said panel assembly, and a cellular paper core of uniform thickness interposed between and adhered to said first and second sheets, said core being formed from strips of paper positioned in side-by-side relationship and adhered together at spaced intervals to define an array of open ended cells closed at opposite ends by said sheets.

2. The reflector of claim 1 wherein said paper sheets are thicker than said paper strips by a multiplication factor within the range of about 2 to 5.

3. The reflector of claim 2 wherein said cells are substantially uniform in cross-sectional area, and the length of said cells is within the range of about 2 to 10 times the square root of said cross-sectional area.

4. The reflector of claim 3 wherein:
    a. said paper sheets are of about 0.025 inch in thickness;
    b. said paper strips are of about 0.008 inch in thickness;
    c. said cell length is about 4 inches; and
    d. said cell cross-sectional area is about one square inch.

5. A lightweight parabolic reflector for solar-thermal collector modules, comprising:
    a. a waterproof adhesively bonded panel assembly formed from paper and defining a parabolic mounting surface extending longitudinally of the panel;

b. a waterproof reflective material secured to said mounting surface by a waterproof adhesive and being operable to reflect incident solar radiation toward a common focal axis extending longitudinally of said panel assembly;

c. said panel assembly including first and second sheets of paper extending in uniformly spaced relationship to define the top and bottom of said panel, and a cellular paper core of uniform thickness interposed between and adhered to said first and second sheets, said core being formed from strips of paper positioned in side-by-side relationship and adhered together at spaced intervals to define an array of open-ended cells closed at opposite ends by said sheets;

d. at least one of said sheets having portions extending around the sides of said panel and into sealed overlapping engagement with portions of the other sheet; and, e. the outer surfaces of said sheets being coated with a waterproofing material, whereby a sealed waterproof panel is provided.

6. The reflector of claim 5 wherein said reflective panel is reinforced by a glass fiber cloth extending across and adhered to portions of said outer surfaces.

7. The reflector of claim 6 wherein said glass fiber cloth extends fully around said outer surfaces.

* * * * *